United States Patent
Ikeya

(10) Patent No.: US 12,029,970 B2
(45) Date of Patent: Jul. 9, 2024

(54) FURNITURE-TYPE APPARATUS FOR OPERATING MOVEMENT IN VIRTUAL SPACE

(71) Applicant: IKEYA SEISAKUSHO CO., LTD., Hamamatsu (JP)

(72) Inventor: Hidesato Ikeya, Hamamatsu (JP)

(73) Assignee: IKEYA SEISAKUSHO CO., LTD., Hamamatsu (JP)

( * ) Notice: Subject to any disclaimer, the term of this patent is extended or adjusted under 35 U.S.C. 154(b) by 0 days.

(21) Appl. No.: 18/280,503

(22) PCT Filed: Nov. 22, 2022

(86) PCT No.: PCT/JP2022/043144
§ 371 (c)(1),
(2) Date: Sep. 6, 2023

(87) PCT Pub. No.: WO2023/120005
PCT Pub. Date: Jun. 29, 2023

(65) Prior Publication Data
US 2024/0082695 A1    Mar. 14, 2024

(30) Foreign Application Priority Data
Dec. 20, 2021    (JP) .................................. 2021-205898

(51) Int. Cl.
*A63F 13/211*    (2014.01)
*A63F 13/218*    (2014.01)
(Continued)

(52) U.S. Cl.
CPC .......... *A63F 13/211* (2014.09); *A63F 13/218* (2014.09); *A63F 13/24* (2014.09);
(Continued)

(58) Field of Classification Search
CPC ...... A63F 13/211; A63F 13/218; A63F 13/24; A63F 13/428; G06F 3/011; G06F 3/04815
See application file for complete search history.

(56) References Cited

U.S. PATENT DOCUMENTS

2016/0015299 A1    1/2016    Chan et al.
2016/0183687 A1*    6/2016    Hoyt .................... A61B 5/6891
297/217.2
(Continued)

FOREIGN PATENT DOCUMENTS

CN    108135361 A    6/2018
CN    110248601 A    9/2019
(Continued)

OTHER PUBLICATIONS

Jan. 24, 2023 International Search Report issued in International Patent Application No. PCT/JP2022/043144.
(Continued)

*Primary Examiner* — Afroza Chowdhury
(74) *Attorney, Agent, or Firm* — Oliff PLC

(57) ABSTRACT

A furniture-type apparatus on which a user can sit includes a leg sensor configured to be disposed on a surface in proximity to user legs and obtain a measurement value representing a displacement of each of the left and right legs as a virtual movement amount of the user in the virtual space, and a back sensor configured to be disposed on a part in proximity to a back of the user and recognize forward movement or backward movement in the virtual space, based on a displacement of the back, wherein the virtual movement amount and a recognition result indicating forward movement or backward movement are output as a virtual movement amount of forward movement or backward movement.

8 Claims, 8 Drawing Sheets

(51) Int. Cl.
*A63F 13/24* (2014.01)
*A63F 13/428* (2014.01)
*G06F 3/01* (2006.01)
*G06F 3/04815* (2022.01)

(52) U.S. Cl.
CPC ............ *A63F 13/428* (2014.09); *G06F 3/011* (2013.01); *G06F 3/04815* (2013.01)

(56) References Cited

U.S. PATENT DOCUMENTS

| | | | |
|---|---|---|---|
| 2016/0320862 A1 | 11/2016 | Schradin et al. | |
| 2017/0161933 A1 | 6/2017 | Chen et al. | |
| 2017/0266572 A1 | 9/2017 | Petrov | |
| 2018/0224928 A1 | 8/2018 | Ross et al. | |
| 2019/0121425 A1 | 4/2019 | Lee et al. | |
| 2019/0289285 A1 | 9/2019 | Nashida et al. | |
| 2019/0300020 A1* | 10/2019 | Alexiou | G05B 9/00 |
| 2020/0060610 A1 | 2/2020 | Wakita | |
| 2020/0097069 A1* | 3/2020 | Schradin | A63F 13/212 |
| 2021/0016187 A1 | 1/2021 | Lee et al. | |

FOREIGN PATENT DOCUMENTS

| | | |
|---|---|---|
| CN | 112221115 A | 1/2021 |
| EP | 3316735 A1 | 5/2018 |
| JP | H06-327836 A | 11/1994 |
| JP | H09-66489 A | 3/1997 |
| JP | H10-502474 A | 3/1998 |
| JP | 2001-296951 A | 10/2001 |
| JP | 2002-238876 A | 8/2002 |
| JP | 2008-48932 A | 3/2008 |
| JP | 2012-165818 A | 9/2012 |
| JP | 2018-89321 A | 6/2018 |
| JP | 2018-527968 A | 9/2018 |
| JP | 2020-144803 A | 9/2020 |
| JP | 2020-201742 A | 12/2020 |
| JP | 6795190 B2 | 12/2020 |
| JP | 2021-517830 A | 7/2021 |
| KR | 10-1815530 B1 | 1/2018 |
| KR | 10-2018-0132027 A | 12/2018 |
| TW | 201721360 A | 6/2017 |
| TW | 201803629 A | 2/2018 |
| WO | 2017-004580 A1 | 1/2017 |
| WO | 2018/021738 A1 | 2/2018 |
| WO | 2018/101279 A1 | 6/2018 |

OTHER PUBLICATIONS

Jan. 24, 2023 Written Opinion issued in International Patent Application No. PCT/JP2022/043144.
Jun. 30, 2023 Non-Final Rejection issued in Taiwanese Patent Application No. 111148588.
Jan. 18, 2022 Non-Final Rejection issued in Japanese Patent Application No. 2021-205898.
Ohshima et al., "Virtual ISU: A Locomotion Interface for Immersive VR Gaming in Seating Position (3)", MOVERE, [retrieved online], [searched on Dec. 12, 2021], Internet <URL: https://movere.co.jp/index.php/crus-3/>.
"VR Controller "VRGO Mini" on Kickstarter, Move within VR by tilting your body", [retrieved online], 2019. https://web.archive.org/web/20191207192615/https://www.dospara.co.jp/express/vr/1270828, <search date Jan. 7, 2022).
"Wight Runner, a VR game controlled by shifting your body weight", [retrieved online], 2019, https://web.archive.org/web/20160723191920/https://jp.ign.com/unity-vr-expo-akiba/4454/news/vrwight-runner, <search date Jan. 7, 2022>.
Movere Inc., Move around in VR, <URL: https://movere.co.jp/index.php/crus-3/ >, search date Dec. 12, 2021.
Power up your Quest 2 with Roto, Next level VI immersion, <URL: https://www.rotovr.com/ >, search date Dec. 12, 2021.
KAT Walk C2 Core, the Most Available Treadmill, KAT VR, (/products/kat-walk-c-2-core), <URL: https://www.kat-vr.com >, search date Dec. 12, 2021.

* cited by examiner

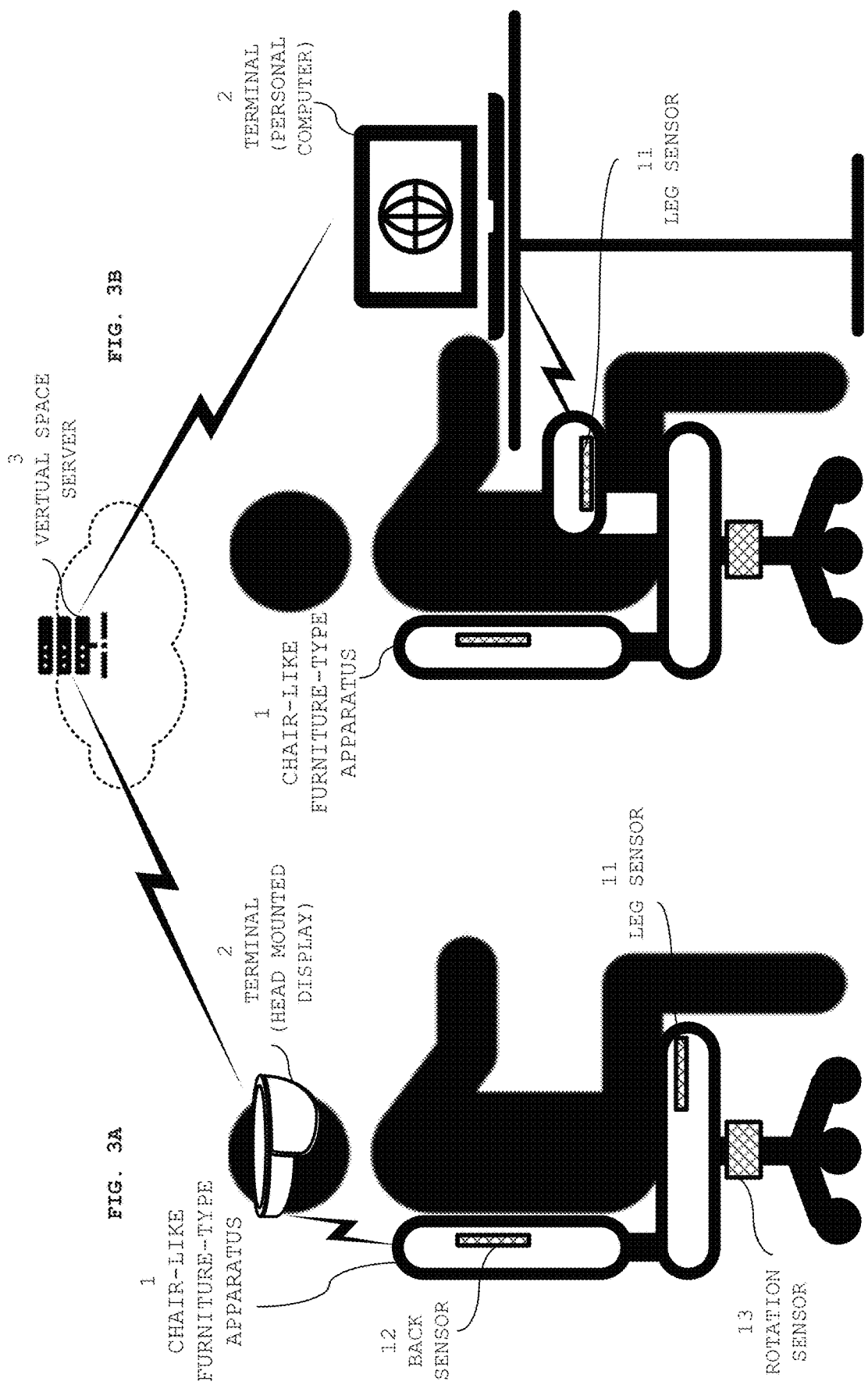

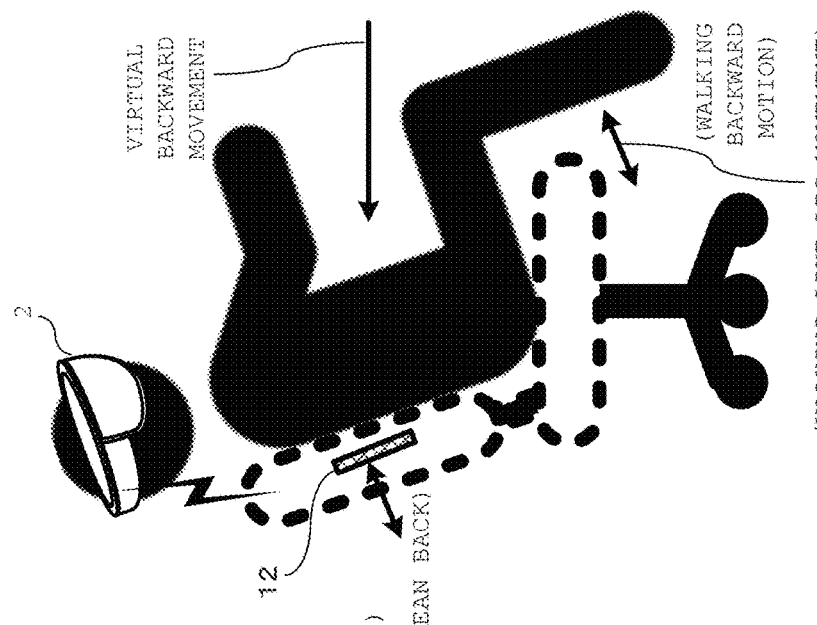
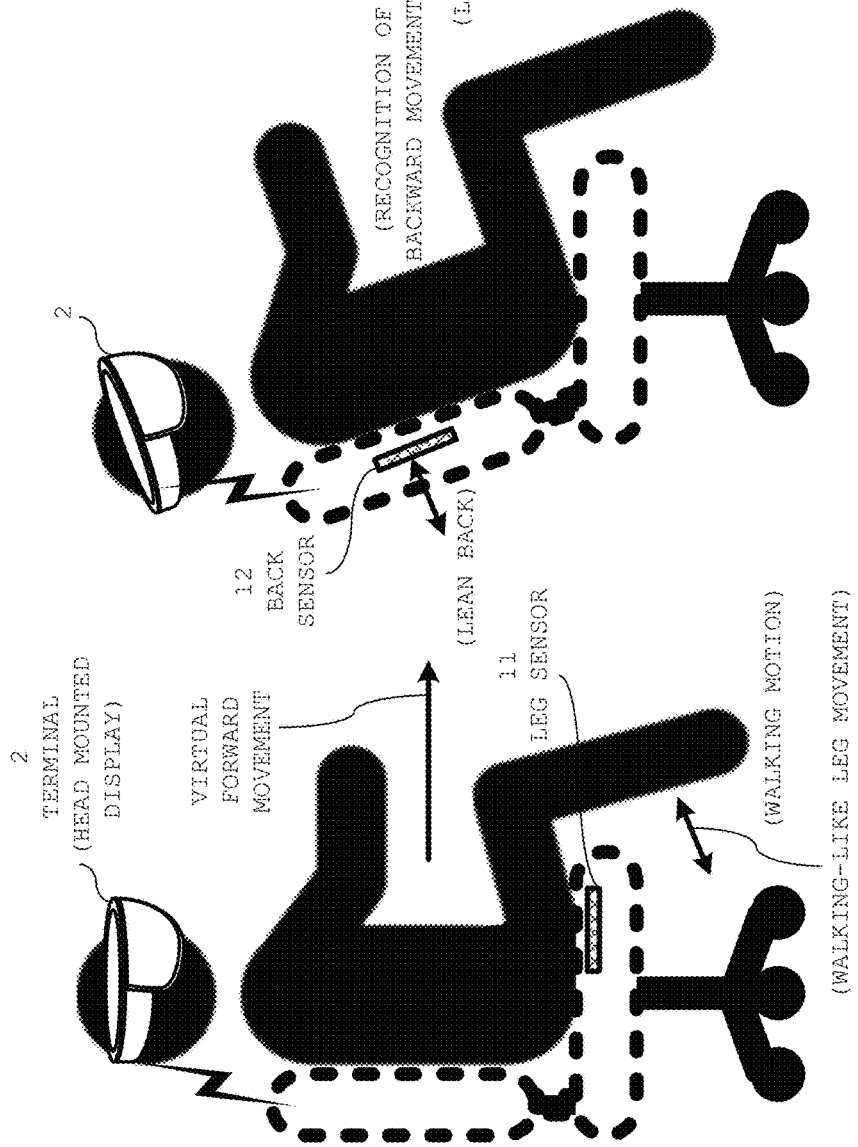

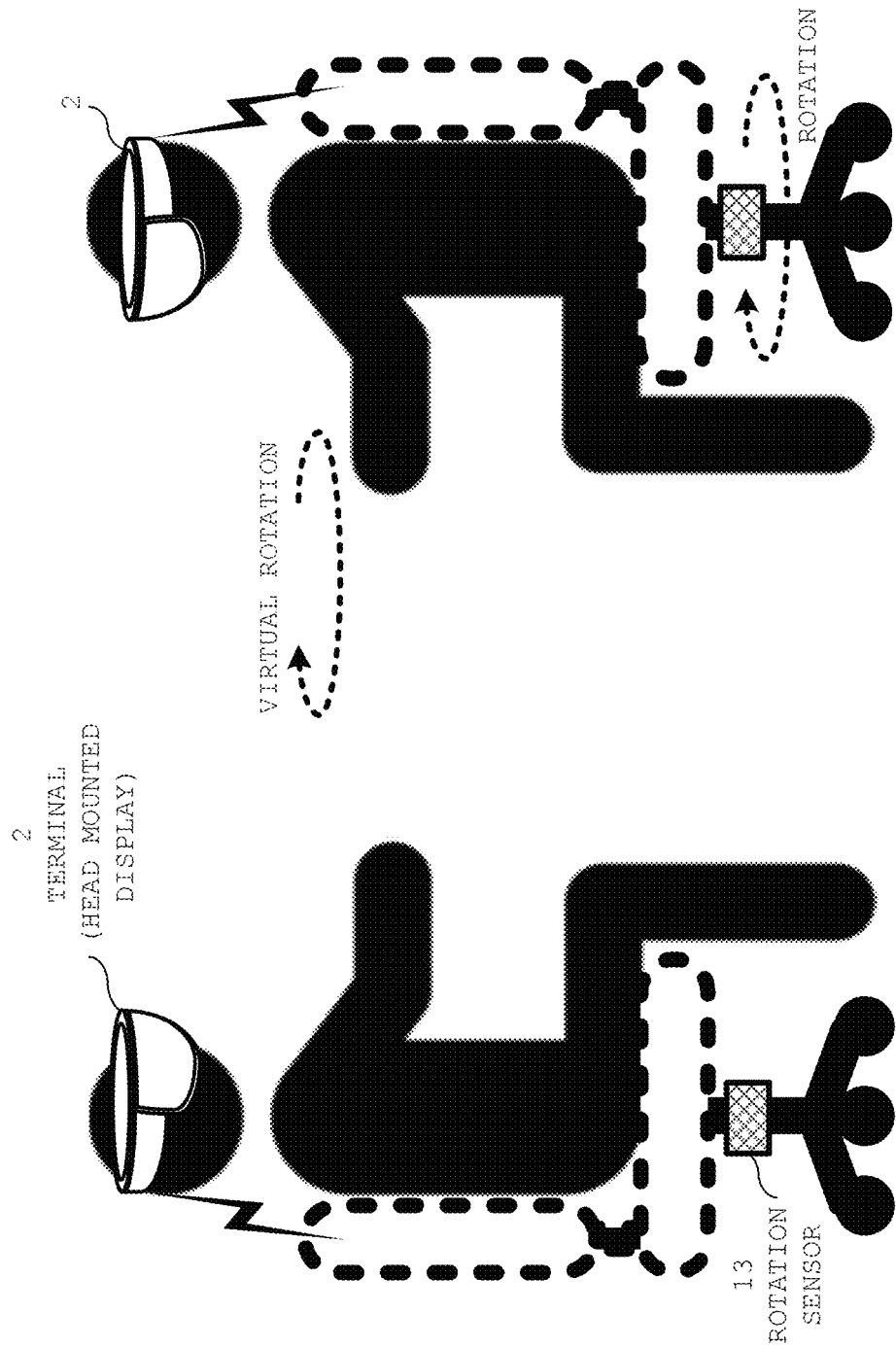

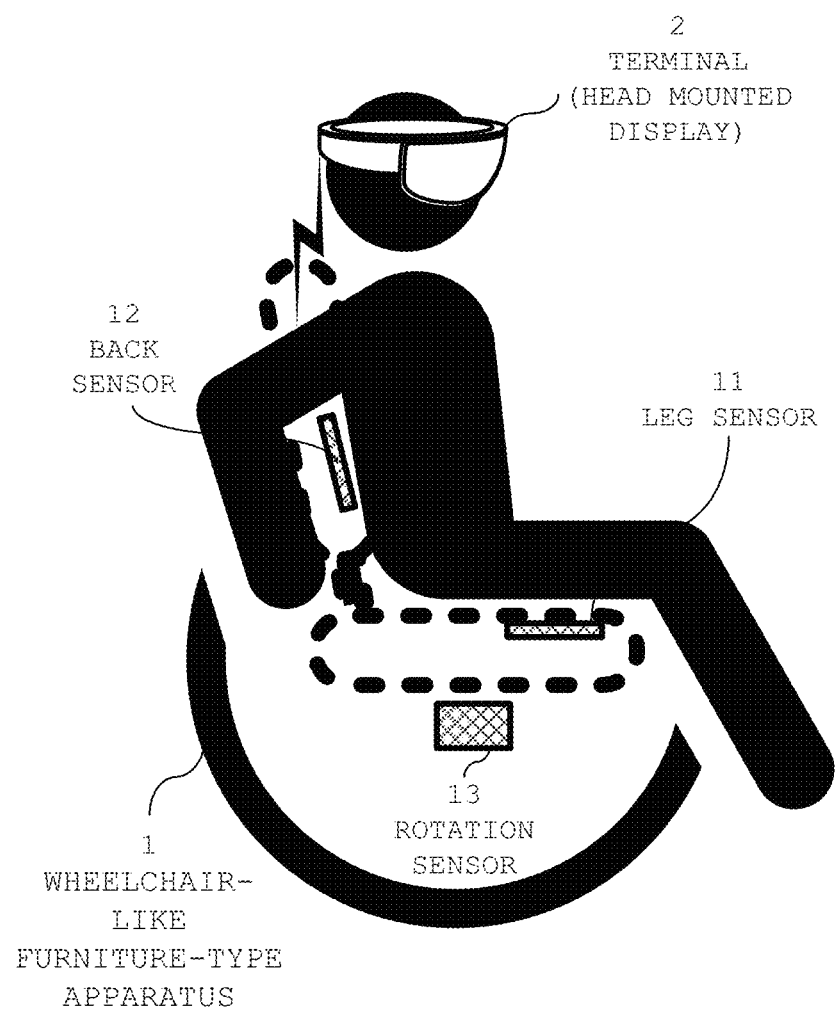

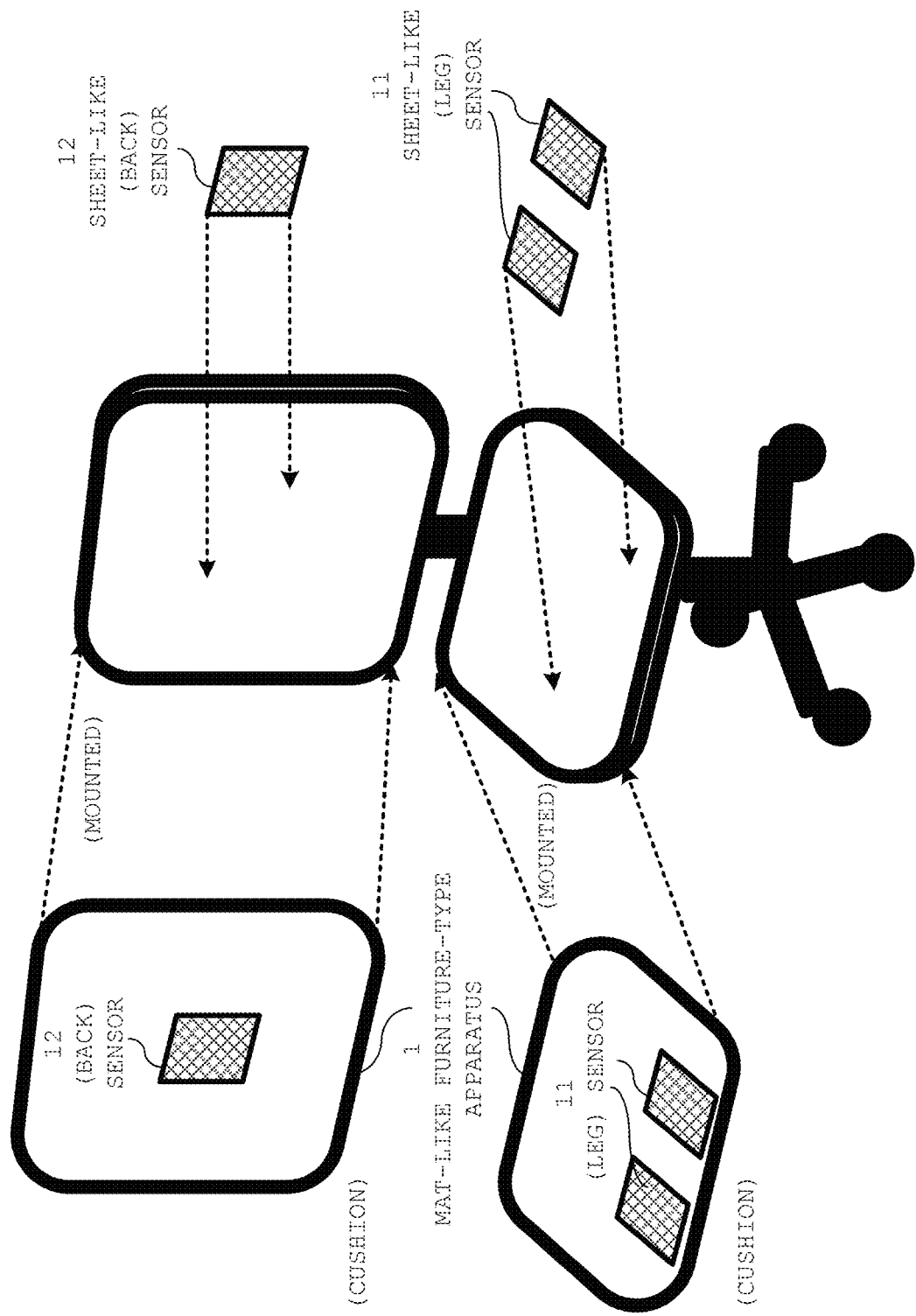

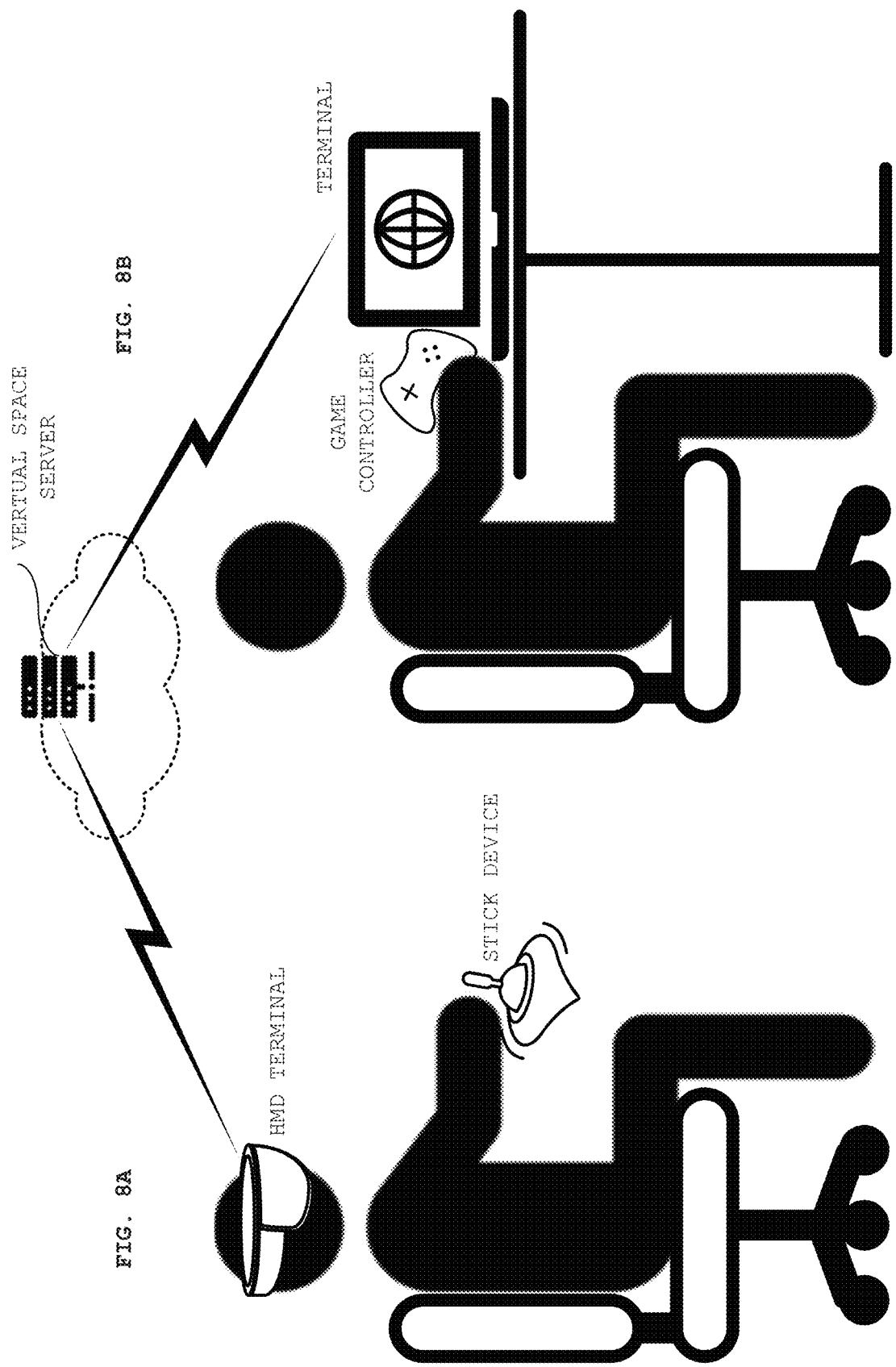

FURNITURE-TYPE APPARATUS FOR OPERATING MOVEMENT IN VIRTUAL SPACE

TECHNICAL FIELD

The present invention relates to a technique for an apparatus that serves as a user interface in a virtual space. In particular, the present invention relates to a technique for operating movement of a virtual object (an avatar or a character) in a space of virtual reality or a game.

Priority is claimed on Japanese Patent Application No. JP2021-205898 filed Dec. 20, 2021 under the Paris Convention, and the content of the Japanese Patent Application is incorporated herein by reference under PCT Rule 20.6.

BACKGROUND ART

Virtual reality refers to a technique for allowing a user wearing a head mounted display (HMD) terminal to visually recognize a three-dimensional virtual space. In virtual reality, users can move in the virtual space by their own operations and can obtain a sense of immersion in the virtual space. The HMD terminal may be a terminal that accesses a virtual space server via a network or may be a terminal that is equipped with its own virtual space server. The HMD terminal detects a movement of the head of a user by a posture sensor and controls the field of view and the position of the user in the virtual space in accordance with a measurement value obtained by the detection.

FIGS. 8A and 8B are schematic diagrams for explaining conventional user operations for the virtual space.

In FIG. 8A, the user wears an HMD terminal on the head. In FIG. 8B, the user is looking at a display of a terminal such as a personal computer, tablet, or smartphone. The terminal accesses a virtual space server via a network and displays a virtual space on its display. The user moves in the virtual space by operating a stick device or a game controller while visually recognizing the virtual space.

The virtual space server may be a server that is dedicated to the virtual space and provided on the Internet or may be a server that is dedicated to the virtual space and provided locally. Examples of the service that provides a virtual space include social virtual reality (VR) platforms such as VRChat (registered trademark), Metaverse (registered trademark), and Second Life (registered trademark).

Conventionally, for example, as disclosed in Patent Literature (PTL) 1 and Non-Patent Literature (NPTL) 1, there has been proposed a technique in which a user operates movement in a virtual space by pressing thighs of the user against a cushion in front of the thighs. This technique includes a thigh support unit that supports the thighs of a user such that the thighs are movable in a traveling direction, a first sensor that detects a force received from the thighs, a second sensor that detects a rotation angle of the thigh support unit, and a third sensor that detects a posture of the user. A walking motion of the user is estimated from the detection results obtained by these sensors, and an image corresponding to the estimated walking motion is presented to the user. More specifically, by supporting the thighs of the user to be movable in traveling direction, a change of the center of gravity is caused to occur in the traveling direction, and further, by presenting the image corresponding to the walking motion of the user, a walking feeling is provided to the user. With this technique, a compact and lightweight device is realized at a low cost without using a large-scale device for moving a floor to be synchronized with the movement of the legs or a driving unit for raising and lowering the thighs.

PTL 2 discloses a chair-like apparatus equipped with a transducer serving as a user interface that replaces a mouse, which is a different type of interface from that for moving the user in a virtual space, though. In this chair-like apparatus, a transducer for detecting a horizontal movement from a rotation movement of the chair and a transducer for detecting a vertical movement are used. Detected signals are output to a display device so that the position of a cursor on the display device can be moved. For example, when the user rotates his or her body, the cursor on the display device is moved horizontally, and when the user moves forward or backward, the cursor on the display device is moved vertically. Further, the detection result obtained by a seat sensor may be used as a left/right click, the detection result obtained by a back sensor may be used as a middle click, and the detection result obtained by a rotation sensor may be used as a scroll by a scroll wheel.

In addition, various operation apparatuses for moving in a virtual space have been proposed. For example, NPTL 2 discloses an apparatus that operates movement of a user in a virtual space by using a walking board disposed under the legs of the user. Further, for example, NPTL 3 discloses an apparatus in which a step device is disposed under the legs of a user seated on a chair and the user operates movement by stepping on the step device.

CITATION LIST

Patent Literature

[PTL 1] Japanese Patent No. 6795190
[PTL 2] Japanese Patent Application Laid-Open No. H10-502474.

Non-Patent Literature

[NPTL 1] MOVERE, [online], [searched on Dec. 12, 2021], Internet <URL: https://movere.co.jp/index.php/crus-3/>
[NPTL 2] KAT-VR, [online], [searched on Dec. 12, 2021], Internet <URL: https://www.kat-vr.com>
[NPTL 3] ROTOVR, [online], [searched on Dec. 12, 2021], Internet <URL: https://www.rotovr.com/>

SUMMARY OF INVENTION

Technical Problem

According to the conventional techniques such as PTL 1 and NPTLs 1-3 described above, an avatar or a character that imitates a user can be moved in a virtual space. That is, the user himself or herself takes initiative and operates the movement in the virtual space while obtaining a sense of immersion in the virtual space.

However, there is a problem in that even when the user walks and moves in the virtual space, it is difficult for the user to actually walk and move in a real space. For example, when the user wearing an HMD terminal moves in the real space while being immersed in the virtual space, the user may collide with a peripheral obstacle. For example, when the user is alone in a room, a range in which the user can move without looking at the surroundings is practically a square having a side of 3 meters or so. Therefore, while the movement of the user is restricted in the real space as much as possible, the user needs to be provided with a sense of freely moving in the virtual space so that the user can enjoy a sense of immersion in the virtual space.

In the technique disclosed in NPTL 1, a walking motion is simulated by sliding on a walking board under the legs. In the techniques disclosed in PTL 1 and NPTL 2, a walking motion is simulated by applying pressure to a cushion in front of the thighs. Both the techniques are used by a user in a standing state so that the user can feel a sense of realism of the walking motion. However, these techniques are not suitable for use for a long period of time or for use by a person with weak legs and loins. In addition, when a rotation operation is performed, the user needs to actually turn around backward, which can raise concerns about collision with an obstacle in the real space. Further, it is considerably difficult to perform an operation of a backward movement such as walking backward.

Incidentally, the technique disclosed in PTL 2 simulates the operation of a mouse by the device arranged on a chair and does not operate the movement of the user in the virtual space.

Therefore, an object of the present invention is to provide a furniture-type apparatus capable of providing a user with a sense of moving in the virtual space while restricting the movement of the user in the real space as much as possible.

Solution to Problem

According to the present invention, there is provided a furniture-type apparatus on which a user can sit, the furniture-type apparatus including: a leg sensor configured to be disposed on a surface in proximity to legs of the user and to obtain a measurement value representing a displacement of each of the left and right legs of the user as a virtual movement amount of the user in a virtual space; and a back sensor configured to be disposed on a part in proximity to a back of the user and to recognize forward movement or backward movement of the user in the virtual space, based on a displacement of the back of the user, wherein the virtual movement amount and a recognition result indicating the forward movement or the backward movement are output as a virtual movement amount of the forward movement or a virtual movement amount of the backward movement.

As one embodiment of the furniture-type apparatus according to the present invention, it is preferable that the leg sensor detects a speed of the displacement as a speed of the virtual movement amount, and the furniture-type apparatus outputs the speed of the virtual movement amount and the recognition result indicating the forward movement or the backward movement as a speed of the virtual movement amount of the forward movement or a speed of the virtual movement amount of the backward movement, and/or that the leg sensor detects an acceleration of the displacement as an acceleration of the virtual movement amount, and the furniture-type apparatus outputs the acceleration of the virtual movement amount and the recognition result indicating the forward movement or the backward movement as an acceleration of the virtual movement amount of the forward movement or an acceleration of the virtual movement amount of the backward movement.

As still another embodiment of the furniture-type apparatus according to the present invention, it is also preferable that the back sensor recognizes the backward movement when detecting the user's leaning back.

As still another embodiment of the furniture-type apparatus according to the present invention, it is also preferable that the leg sensor is disposed for each of the right leg and the left leg of the user and obtains a measurement value alternately from the right leg and the left leg, which is used as a virtual movement amount corresponding to a walking motion of the user in the virtual space.

As still another embodiment of the furniture-type apparatus according to the present invention, it is also preferable that the leg sensor is disposed on a surface to which a thigh of the user is in proximity and/or a surface to which a calf of the leg of the user is in proximity.

As still another embodiment of the furniture-type apparatus according to the present invention, it is also preferable that the furniture-type apparatus further includes a rotation sensor configured to be disposed on a rotation part of a leg part of furniture or on a seat part on which the user sits and to output a measurement value representing a displacement in a motion of the user rotating his or her body to the left or right as a virtual movement amount to the left or right.

As still another embodiment of the furniture-type apparatus according to the present invention, it is also preferable that the furniture-type apparatus is in a form of a chair, a wheelchair, a mat, or a sheet.

As still another embodiment of the furniture-type apparatus according to the present invention, it is also preferable that the furniture-type apparatus causes a terminal to transmit an alarm to the user or a monitoring person when the virtual movement amount is equal to or more than a first predetermined threshold or when the virtual movement amount is continuously equal to or less than a second predetermined threshold for a predetermined period of time.

Advantageous Effects of Invention

The furniture-type apparatus according to the present invention is capable of providing a user with a sense of moving in the virtual space while restricting the movement of the user in the real space as much as possible.

BRIEF DESCRIPTION OF DRAWINGS

FIGS. 3A and 3B are schematic diagrams for explaining user operations to a virtual space in the present invention;

FIGS. 4A to 4C are schematic diagrams for explaining virtual forward movement and backward movement in the present invention;

FIG. 5 is a schematic diagram for explaining virtual rotation in the present invention;

FIG. 6 is a schematic diagram illustrating a furniture-type apparatus in the form of a wheelchair according to the present invention;

FIG. 7 is a schematic diagram illustrating a furniture-type apparatus in the form of a mat and a furniture-type apparatus in the form of a sheet according to the present invention; and FIGS. 8A and 8B are schematic diagrams for explaining conventional user operations for a virtual space.

DESCRIPTION OF EMBODIMENTS

Hereinafter, embodiments of the present invention will be described in detail with reference to the drawings.

Figure 1:
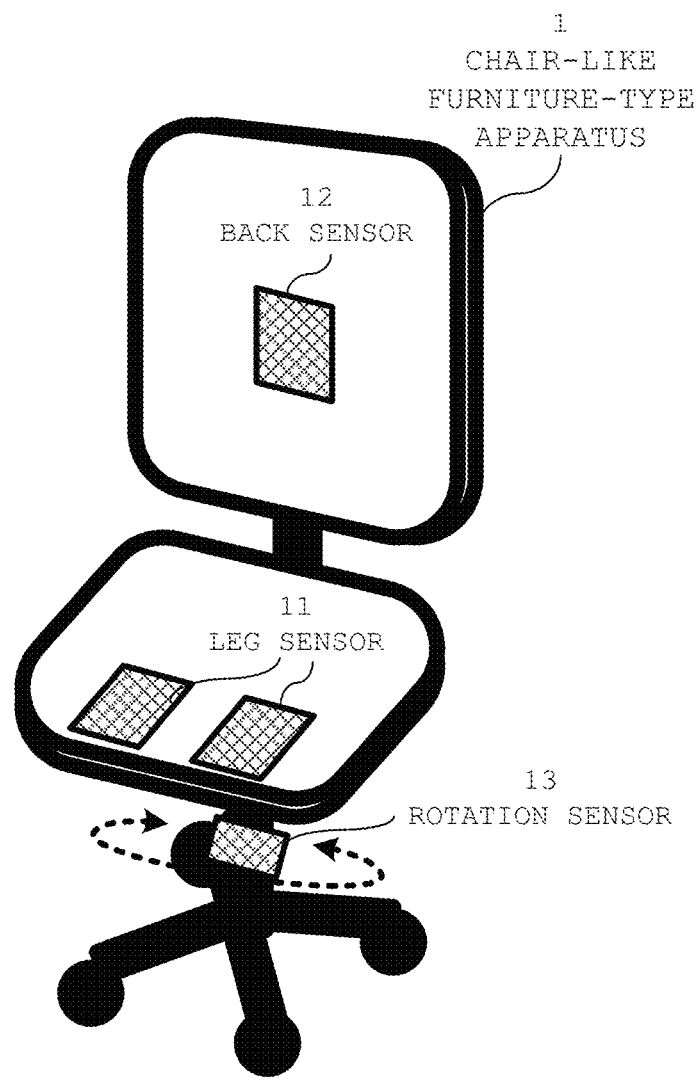
FIG. 1 is a schematic diagram illustrating a furniture-type apparatus in the form of a chair according to the present invention.

FIG. 1 is a schematic diagram illustrating a furniture-type apparatus in the form of a chair according to the present invention.

FIG. 1 illustrates a furniture-type apparatus 1 in the form of a chair as one embodiment of the furniture-type apparatus according to the present invention. In the furniture-type apparatus 1, at least one sensor is disposed on a surface in proximity to the body of a user. Each sensor outputs a measurement value representing a displacement of each of the left part and right part of the body of the user as a virtual movement amount of the user in the virtual space.

As illustrated in FIG. 1, the furniture-type apparatus 1 in the form of a chair includes a leg sensor 11, a back sensor 12, and a rotation sensor 13. Of course, it is possible to dispose only one of these sensors. These sensors may be capable of transmitting their own outputs (information about the virtual movement amounts) to the outside (for example, a terminal 2). Alternatively, a communication unit that receives the outputs from these sensors and transmits information about the virtual movement amounts to the outside (for example, the terminal 2) may be provided.

<Leg Sensor 11>

The leg sensor 11 is disposed on a surface in proximity to each thigh of the seated user. As illustrated in FIG. 1, the leg sensor 11 is disposed on a surface in proximity to the back side of each thigh and detects a displacement corresponding to a motion of the user lowering the raised thigh to the surface. In addition, the leg sensor 11 outputs a measurement value representing a displacement of each of the left and right legs, which is caused by the motion of the user, as a virtual movement amount of forward movement of the user in the virtual space. In a case where the left and right body parts whose displacements are to be detected are ankles, arms, or the like, the sensor 11 is disposed on a surface in proximity to each of the body parts.

The leg sensor 11 may include a pressure sensor such as micro electro mechanical systems (MEMS). For example, in the case of MEMS, pressure is detected as a deformation applied to a diaphragm. A type of pressure sensor that detects a change in capacitance or a distortion of a gauge may also be used. Further, the leg sensor 11 may include a Hall effect sensor. The Hall effect sensor can detect pressure in combination with a permanent magnet. Further, the leg sensor 11 may include a distance sensor, a speed sensor, or an acceleration sensor. In any case, the device included in the leg sensor 11 may detect a displacement of the body of the user, which is caused by a walking-like leg motion. In addition, it is preferable that the device is usable without physical contact and practically free from wearing out.

<Back Sensor 12>

The back sensor 12 is disposed on a surface in proximity to the back of the seated user. When the back sensor 12 detects a displacement of the back caused by a motion of the user, the back sensor 12 recognizes that the user is moving backward in the virtual space and outputs a recognition result indicating backward movement. When the back sensor 12 does not recognize backward movement, the back sensor 12 may output a recognition result indicating forward movement in accordance with the output of the leg sensor 11. As with the leg sensor 11, the back sensor 12 may include a pressure sensor, a Hall effect sensor, a distance sensor, or the like. In addition, the back sensor 12 may include a bend sensor or an inclination sensor that is attached to a support of the backrest and is capable of measuring a degree of back bending.

<Rotation Sensor 13>

The rotation sensor 13 is disposed on a part where rotation of the body of the seated user can be detected. For example, the rotation sensor 13 is disposed on a rotating part of a leg part of the furniture or a seat part on which the user sits. The rotation sensor 13 outputs a measurement value representing a displacement caused by a motion of the user rotating the body to the left or right, as a virtual rotation amount, which is a virtual movement amount to the left or right of the user in the virtual space.

The rotation sensor 13 is a sensor (for example, a rotary encoder) that detects a rotation difference between a rotating object and a non-rotating object. Such a device can also output a rotation angle or a rotation speed. The Hall effect sensor described above can also detect the rotation angle. As another embodiment, the rotation sensor may include an inertial measurement unit (IMU). By using the IMU, even when the furniture-type apparatus is in the form of a sheet, rotation can be detected by a gyro sensor. Of course, the IMU may be a sensor unit in which a plurality of physical information sensors (for example, an acceleration sensor, a rotation angle acceleration sensor, and the like) other than the gyro sensor are integrated into one package. By using the IMU, no adjustment or correction to the sensor is needed, and it is possible to acquire a highly accurate measurement value with an optimum degree of freedom. The furniture-type apparatus 1 in the form of a chair according to the present invention can also detect the rotation angle of the seat surface by incorporating the rotation sensor 13 not only in the leg part having a rotating shaft but also in the seat part, for example.

Note that the virtual rotation amount, which is the measurement value output by the rotation sensor 13, is an amount representing the rotation of the entire body of the virtual object (the avatar or the character) in the virtual space. This virtual rotation amount includes, for example, information about the orientation of the body other than the head. The orientation of the head is detected by, for example, a posture sensor mounted on the HMD terminal.

Figure 2A:
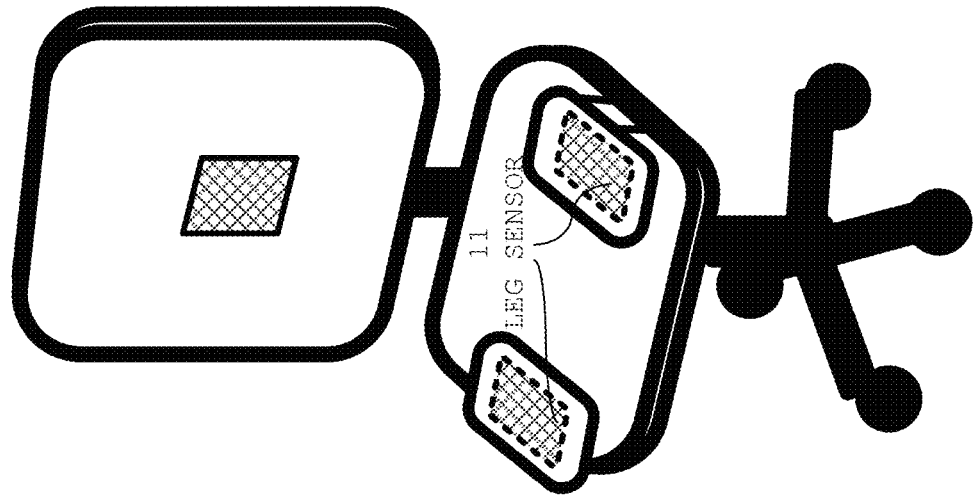
FIGS. 2A and 2B are schematic diagrams for explaining an arrangement of the leg sensor in the furniture-type apparatus in the form of a chair according to the present invention.
Figure 2B:
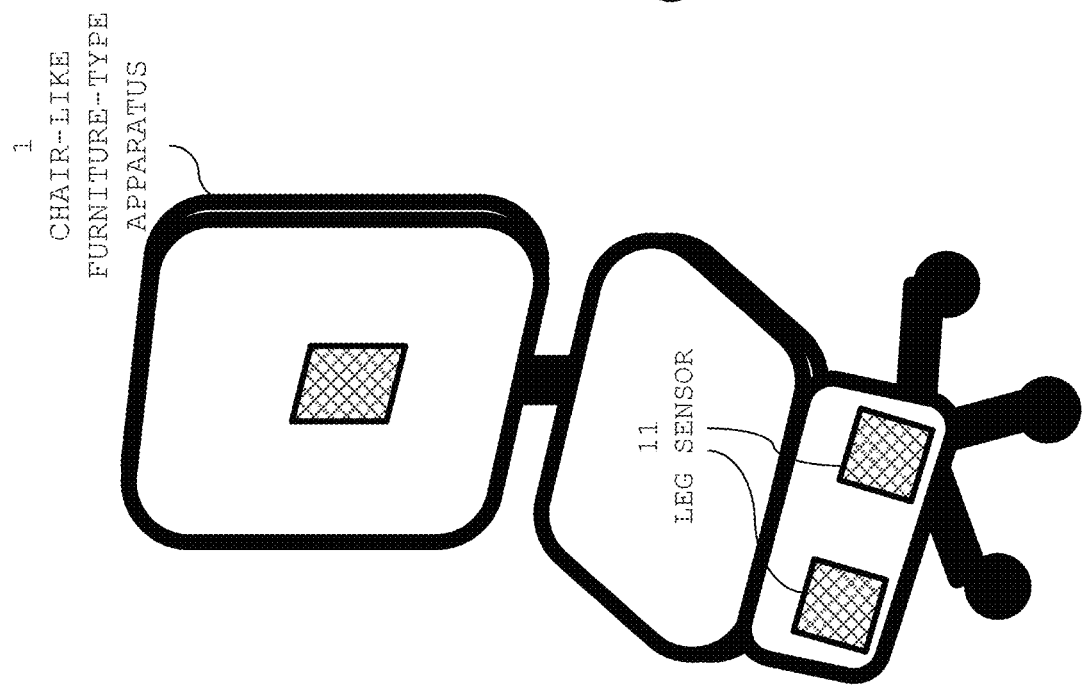

FIGS. 2A and 2B are schematic diagrams for explaining an arrangement of the leg sensor in the furniture-type apparatus in the form of a chair according to the present invention.

In the furniture-type apparatus 1 illustrated in FIG. 2A, the seat surface is provided with a front curtain part, and the leg sensor 11 is disposed on the front curtain part. This leg sensor 11 is disposed on a surface in proximity to each calf (the back side of each calf) of each leg of the seated user. With this arrangement, the leg sensor 11 detects a displacement corresponding to a kicking motion in which the user moves the calf backward and kicks. In the furniture-type apparatus 1 illustrated in FIG. 2B, the leg sensor 11 is disposed on a surface in proximity to each thigh (the front side of each thigh) of the seated user. With this arrangement, the leg sensor 11 detects a displacement corresponding to a motion in which the user pushes up the thigh. This leg sensor 11 also serves as a cover for covering, for example, the thighs of the user. That is, this leg sensor 11 also provides an effect of supporting the thighs so that the user immersed in the virtual space does not fall from the chair.

FIGS. 3A and 3B are schematic diagrams for explaining user operations to the virtual space in the present invention.

The user can operate his or her own movement in the virtual space while sitting on the furniture-type apparatus 1 in the form of a chair according to the present invention. As illustrated in FIG. 3A, the user wears an HMD terminal 2 on the head as in FIG. 8A, and the HMD terminal 2 accesses a virtual space server 3 via wireless communication. As in FIG. 1, the furniture-type apparatus 1 in the form of a chair illustrated in FIG. 3A can detect a displacement of each of (the back sides of) the left and right thighs. As another embodiment illustrated in FIG. 3B, the user views a display of a terminal 2 as in FIG. 8B, and the terminal 2 accesses the virtual space server 3 via the network. The furniture-type apparatus 1 in the form of a chair illustrated in FIG. 3B can detect a displacement of each of (the front sides of) the left and right thighs of the user as in FIG. 2B.

The terminal 2 communicates with (an information processing unit of) the furniture-type apparatus 1 in a wireless or wired manner, regards a virtual movement amount received from the furniture-type apparatus 1 as a movement amount of a virtual object (an avatar or a character) belonging to the user in a virtual space or a game space visually recognized by the user, and controls the movement of the virtual object.

FIGS. 4A to 4C are schematic diagrams for explaining virtual forward movement and backward movement in the present invention.

<FIG. 4A: Virtual Forward Movement>

As illustrated in FIG. 4A, the leg sensor 11 is disposed for each of the left and right legs of the user and outputs a measurement value representing a displacement detected by each of the left and right sensors as a detection result indicating a walking motion of the user in the virtual space. The user alternately moves the left and right thighs and/or calves up and down (in a walking-in-place or marching-in-place manner) as if the user were walking in the real space. In response to such motion, the leg sensor 11 detects displacements corresponding to the motion, outputs measurement values obtained from the detection as virtual movement amounts in the virtual space, and reflects the measurement values on walking in the virtual space.

As another embodiment, assuming that the virtual object in the virtual space needs to perform exercise for training the muscles of the legs and loins, the exercise of the legs performed by the user in the real space becomes the exercise of the virtual object in the virtual space.

The leg sensor 11 may output an amount of change in displacement per unit time, that is, the speed of displacement, as the speed of virtual movement amount. In this case, the movement of the virtual object in the virtual space becomes faster as the speed of alternately moving the left and right legs by the user in the real space becomes higher. Conversely, the movement of the virtual object in the virtual space becomes slower as the speed of alternately moving the left and right legs in the real space becomes lower.

In addition, the leg sensor 11 may output an amount of change in displacement speed per unit time in the sensor, that is, the acceleration of displacement, as the acceleration of virtual movement amount. In this case, the acceleration of the movement of the virtual object in the virtual space becomes larger as the change in pressure applied from the legs of the user in the real space becomes larger. Conversely, the acceleration of the movement of the virtual object in the virtual space becomes smaller as the change in pressure applied from the legs of the user becomes smaller.

Further, when the user moves both legs simultaneously in the real space, the leg sensor 11 may output a measurement value representing a displacement detected from such a motion as a virtual movement amount corresponding to a jump of the user and cause the virtual object in the virtual space to jump instantaneously.

As another embodiment, in a case where the virtual space is assumed to be underwater, when the user moves the left and right legs alternately in the real space, the virtual object may be set to be operated to move such that the virtual object is swimming in the water with flutter kicks. Further, when the user moves the legs simultaneously in the real space, the virtual object may be set to be operated to move such that the virtual object is swimming in the water with butterfly strokes.

In the embodiments described above, the virtual movement amount has been described as an amount corresponding to the movement distance of the avatar. In contrast, as another embodiment, the virtual movement amount may be set as an amount to be reflected in the joint angle of the avatar (virtual object) in the virtual space. When the avatar moves, the posture (joint angle) of the avatar also changes in accordance with the speed of the movement and the acceleration of the movement. From this regard, it is preferable that the virtual movement amount of the avatar in the virtual space serve as not only an amount used for just a movement of the avatar itself but also an amount used for affecting various video spaces that change in accordance with the movement of the avatar.

<FIG. 4B: Recognition of Virtual Backward Movement>

As illustrated in FIG. 4B, the back sensor 12 recognizes and outputs a measurement value representing a displacement of the back of the user as an amount corresponding to the backward movement of the user in the virtual space. This is to determine the direction of movement of the virtual object as backward movement.

<FIG. 4C: Virtual Backward Movement>

After the direction of movement of the virtual object is recognized to be backward movement as illustrated in FIG. 4B, the user alternately moves the left and right thighs and/or calves up and down (in a walking-in-place or marching-in-place manner) as if the user were walking in the real space. That is, as an operation performed on the virtual object, the user in the real space moves the left and right legs alternately while keeping a state in which the user leans back with his or her back pressed against the backrest. By performing this operation, the virtual object in the virtual space moves backward in a walking backward manner.

FIG. 5 is a schematic diagram for explaining virtual rotation in the present invention.

The rotation sensor 13 is disposed, for example, on a rotation part of the leg part of the furniture. As illustrated in FIG. 5, the rotation sensor 13 is disposed on a rotating shaft of the chair and can detect the rotation angle and the rotation speed of the chair.

<Terminal 2>

According to FIGS. 3A and 3B described above, the furniture-type apparatus 1 communicates with the terminal 2 that provides the user with a virtual space. The terminal 2 is, for example, a terminal such as an HMD terminal or a personal computer and is a device that allows the user to visually recognize the virtual space.

In particular, when the user is wearing the HMD terminal on the head, the user is usually experiencing the virtual space while obtaining a sense of immersion. Therefore, the action of the user in the real space may cause a dangerous situation such as a fall. Therefore, when the virtual movement amount received from the furniture-type apparatus 1 satisfies, for example, the following condition 1 or 2, the terminal 2 transmits an alarm to the user.

1. The obtained virtual movement amount is equal to or more than a first predetermined threshold.
2. The obtained virtual movement amount continues to be equal to or less than a second predetermined threshold for a predetermined period of time.

For example, if the user leans back excessively, the chair may fall. Thus, when the virtual movement amount received from the back sensor 12 is equal to or more than a predetermined threshold, an alarm is transmitted to the user or a monitoring person. For example, in a case of a nursing facility for rehabilitation, the user may be a person in need of care, and the monitoring person may be a care worker. For example, in a case of a hospital, the user may be a patient, and the monitoring person may be a nurse. In addition, when the user has not moved the legs for a long time, the user may suffer an economy-class syndrome. In this case, when the virtual movement amount received from the leg sensor 11 continues to be equal to or less than a predetermined threshold for a predetermined period of time, an alarm is transmitted to the user or the monitoring person. For example, in a case where the furniture-type apparatus 1 is a seat on an airplane, the user may be a passenger, and the monitoring person may be a cabin attendant. Further, when the user repeats a leg motion, a back motion, or a rotation motion excessively, a dangerous situation may occur. When the virtual movement amount received from the furniture-type apparatus 1 indicates such a case, the terminal 2 transmits an alarm.

<Various Aspects of Furniture-Type Apparatus 1>

While the furniture-type apparatus 1 may be in the form of a chair as described above, the furniture-type apparatus 1 may be in the form of a wheelchair, a mat, or a sheet as another embodiment.

FIG. 6 is a schematic diagram illustrating a furniture-type apparatus in the form of a wheelchair according to the present invention.

As illustrated in FIG. 6, a furniture-type apparatus 1 is provided in the form of a wheelchair. For example, when the user who is a physically disabled person in need of care wears an HMD terminal 2 and experiences a virtual space, it is also preferable for the user to use this furniture-type apparatus 1 in the form of a wheelchair. Accordingly, even the user with weak legs and loins can be immersed in the virtual space in a seated state. For example, when the user performs walking training as rehabilitation, the HMD terminal 2 projects, on its display, an image in which the user is walking by himself or herself in the virtual space. As a result, it is possible for the user to recognize that the user can walk by himself or herself in the virtual space while sitting on the wheelchair in the real space so that rehabilitation for recovering the walking nerves in the brain can also be performed.

FIG. 7 is a schematic diagram illustrating a furniture-type apparatus in the form of a mat and a furniture-type apparatus in the form of a sheet according to the present invention.

A furniture-type apparatus in the form of a mat may be a cushion or have a cushion shape. This cushion as the furniture-type apparatus is placed to be in proximity to the body of the user and can have a sensor incorporated therein. This cushion may be mountable on the seat surface and/or the backrest surface of the chair. Further, the furniture-type apparatus of the present invention may be in the form of a sheet. This sheet itself as the furniture-type apparatus is a sensor and is placed to be in proximity to the body of the user. For example, when this sheet is a built-in pressure-distribution sensor sheet and is a film-like sensor sheet having a thickness of approximately 0.1 mm, applied pressure can be detected in real time. Further, when such a sheet is applied to the leg sensor 11, depending on the type of the sheet, the left and right pressures may be detected by only one sheet without using one sheet for each of the left and right legs (without using two sheets in total).

As described above in detail, the furniture-type apparatus according to the present invention is capable of providing a user with a sense of moving in a virtual space while the movement of the user in the real space is restricted as much as possible.

The foregoing embodiments are by way of examples of the present invention only and are not intended to limit thereto, thus many widely different alternations and modifications of the present invention may be constructed. Accordingly, the present invention is to be limited only as defined by the following claims and equivalents thereto.

REFERENCE SIGNS LIST

1 Furniture-type apparatus; 11 Leg sensor; 12 Back sensor; 13 Rotation sensor; 2 Terminal; and 3 Virtual space server.

The invention claimed is:

1. A furniture-type apparatus on which a user can sit, the apparatus comprising:
a leg sensor configured to be disposed on a surface in proximity to legs of the user and to obtain a measurement value representing a displacement of each of the left and right legs of the user as a virtual movement amount representing a magnitude of movement of the user in a virtual space; and
a back sensor configured to be disposed on a part in proximity to a back of the user and to recognize whether a direction of movement of the user is forward or backward in the virtual space, based on a displacement of the back of the user,
the virtual movement amount and a recognition result indicating whether the direction is forward or backward being output as a virtual movement amount of forward movement or a virtual movement amount of backward movement, each of which specifies a combination of the magnitude and the direction of movement of the user in the virtual space.

2. The furniture-type apparatus as claimed in claim 1, wherein the leg sensor detects a speed of the displacement as a speed of the virtual movement amount, and the furniture-type apparatus outputs the speed of the virtual movement amount and the recognition result indicating whether the direction is forward or backward as a speed of the virtual movement amount of forward movement or a speed of the virtual movement amount of backward movement, and/or
wherein the leg sensor detects an acceleration of the displacement as an acceleration of the virtual movement amount, and the furniture-type apparatus outputs the acceleration of the virtual movement amount and the recognition result indicating whether the direction is forward or backward as an acceleration of the virtual movement amount of forward movement or an acceleration of the virtual movement amount of backward movement.

3. The furniture-type apparatus as claimed in claim 1, wherein the back sensor recognizes that the direction is backward when detecting leaning back of the user.

4. The furniture-type apparatus as claimed in claim 1, wherein the leg sensor is disposed for each of the right leg and the left leg of the user and obtains a measurement value alternately from the right leg and the left leg to be used as a virtual movement amount corresponding to a walking motion of the user in the virtual space.

5. The furniture-type apparatus as claimed in claim 1, wherein the leg sensor is disposed on a surface to which a thigh of the user is in proximity and/or a surface to which a calf of the leg of the user is in proximity.

6. The furniture-type apparatus as claimed in claim 1, further comprising a rotation sensor configured to be disposed on a rotation part of a leg part of furniture or on a seat part on which the user sits and to output a measurement value representing a displacement in a motion of the user rotating his or her body to the left or right as a virtual movement amount to the left or right.

7. The furniture-type apparatus as claimed in claim 1, wherein the furniture-type apparatus is in a form of a chair, a wheelchair, a mat, or a sheet.

8. The furniture-type apparatus as claimed in claim 1, wherein the furniture-type apparatus causes a terminal to transmit an alarm to the user or a monitoring person when the virtual movement amount is equal to or more than a first predetermined threshold or when the virtual movement amount is continuously equal to or less than a second predetermined threshold for a predetermined period of time.

\* \* \* \* \*